United States Patent
Raguseo

(10) Patent No.: US 7,305,444 B2
(45) Date of Patent: Dec. 4, 2007

(54) METHOD AND SYSTEM FOR CONTROLLING DELIVERY OF INFORMATION IN A FORUM

(75) Inventor: Domenico Raguseo, Pomezia (IT)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 10/328,351

(22) Filed: Dec. 23, 2002

(65) Prior Publication Data

US 2003/0140106 A1 Jul. 24, 2003

(30) Foreign Application Priority Data

Jan. 23, 2002 (EP) .................. 02368008

(51) Int. Cl.
*G06F 15/16* (2006.01)
(52) U.S. Cl. .................. 709/206; 709/204
(58) Field of Classification Search ........ None
See application file for complete search history.

(56) References Cited

U.S. PATENT DOCUMENTS

| | | | | |
|---|---|---|---|---|
| 5,928,325 A * | 7/1999 | Shaughnessy et al. ...... 709/206 |
| 6,034,970 A * | 3/2000 | Levac et al. ................. 370/466 |
| 6,192,396 B1 * | 2/2001 | Kohler ........................ 709/206 |
| 6,529,942 B1 * | 3/2003 | Gilbert ........................ 709/206 |
| 6,557,027 B1 * | 4/2003 | Cragun ....................... 709/204 |
| 6,816,887 B1 * | 11/2004 | Shaw et al. ................. 709/207 |
| 2002/0052773 A1 * | 5/2002 | Kraemer et al. ............... 705/9 |

* cited by examiner

*Primary Examiner*—Kenny Lin
(74) *Attorney, Agent, or Firm*—Duke W. Yee; Jeffrey S. LaBaw; Wayne P. Bailey

(57) ABSTRACT

The present invention discloses a method and a corresponding system for controlling delivery of information in a forum. In the method (300a, 300b) of the invention a user provides (306) the text of a new message to be submitted to the forum. The user then selects (315) every confidential portion of the text, and inputs (318) corresponding replacement information. A confidential version of the message (consisting of the original text) is made available (345, 351) only to a specific subset of the participants in the forum; a public version of the message, obtained substituting (366) the replacement information for the corresponding confidential portions of the original text, is made available to all the other participants.

5 Claims, 4 Drawing Sheets

METHOD AND SYSTEM FOR CONTROLLING DELIVERY OF INFORMATION IN A FORUM

FIELD OF THE INVENTION

The present invention relates to the field of on-line services, and in particular to a method and system for controlling delivery of information in a forum.

BACKGROUND ART

A forum (sometimes called newsgroup or conference) is a particular type of online service, in which participants can meet to discuss a topic of common interest. Forums have become very popular in the last years; particularly, on the INTERNET there are literally thousands of forums covering every conceivable interest.

The forums are useful for acquiring a basic knowledge about a topic or for obtaining a historical perspective on trends and opinions. Moreover, the forums may be used to submit questions of different type, in order to receive corresponding answers provided by experts in the specific field.

Each message submitted to a forum (for its own nature) is always made available to all the participants, so as to be shared among the whole community. A drawback of this approach is that sometimes the message includes information the participant does not wish to disseminate. However, this information is often necessary, for example to put the experts in the position of answering the questions.

As a consequence, the participant is prevented from exploiting the services offered by the forum. This problem is particular acute in forums dealing with medical or legal topics, wherein the questions often relate to private matters that are strictly confidential.

SUMMARY OF THE INVENTION

It is an object of the present invention to provide a method of controlling delivery of information in a forum.

It is another object of the present invention to enable information to be distributed selectively among the participants in the forum.

It is yet another object of the present invention to make available different versions of each message submitted to the forum to corresponding sets of the participants.

The accomplishment of these and other related objects is achieved by a method of controlling delivery of information in a forum having a plurality of participants, the method including the steps of: providing a plurality of different versions of a message each one for a corresponding set of the participants, submitting the versions of the message to the forum, and making available each version of the message to the corresponding set of the participants.

The present invention also provides a computer program application for performing the method, and a product storing the program application. Furthermore, the present invention provides a corresponding system for controlling delivery of information in a forum.

Moreover, the invention provides a computer program directly loadable into a working memory of a client computer for performing a method of controlling delivery of information in a forum having a plurality of participants when the program is run on the client computer, the client computer being suitable to be connected to a server computer hosting the forum, wherein the method includes the steps of: providing a plurality of different versions of a message each one for a corresponding set of the participants, and submitting the versions of the message to the forum for causing the server computer to make available each version of the message to the corresponding set of the participants.

In addition, the invention provides a computer program directly loadable into a working memory of a server computer for performing a method of controlling delivery of information in a forum when the program is run on the server computer, the forum being hosted by the server computer and having a plurality of participants, wherein the method includes the steps of: receiving a plurality of different versions of a message each one for a corresponding set of the participants from a client computer suitable to be connected to the server computer, appending the versions of the message to the forum, and making available each version of the message to the corresponding set of the participants.

The present invention also provides respective products storing the programs; furthermore, the invention provides a corresponding client computer and a corresponding server computer.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT

Figure 1:
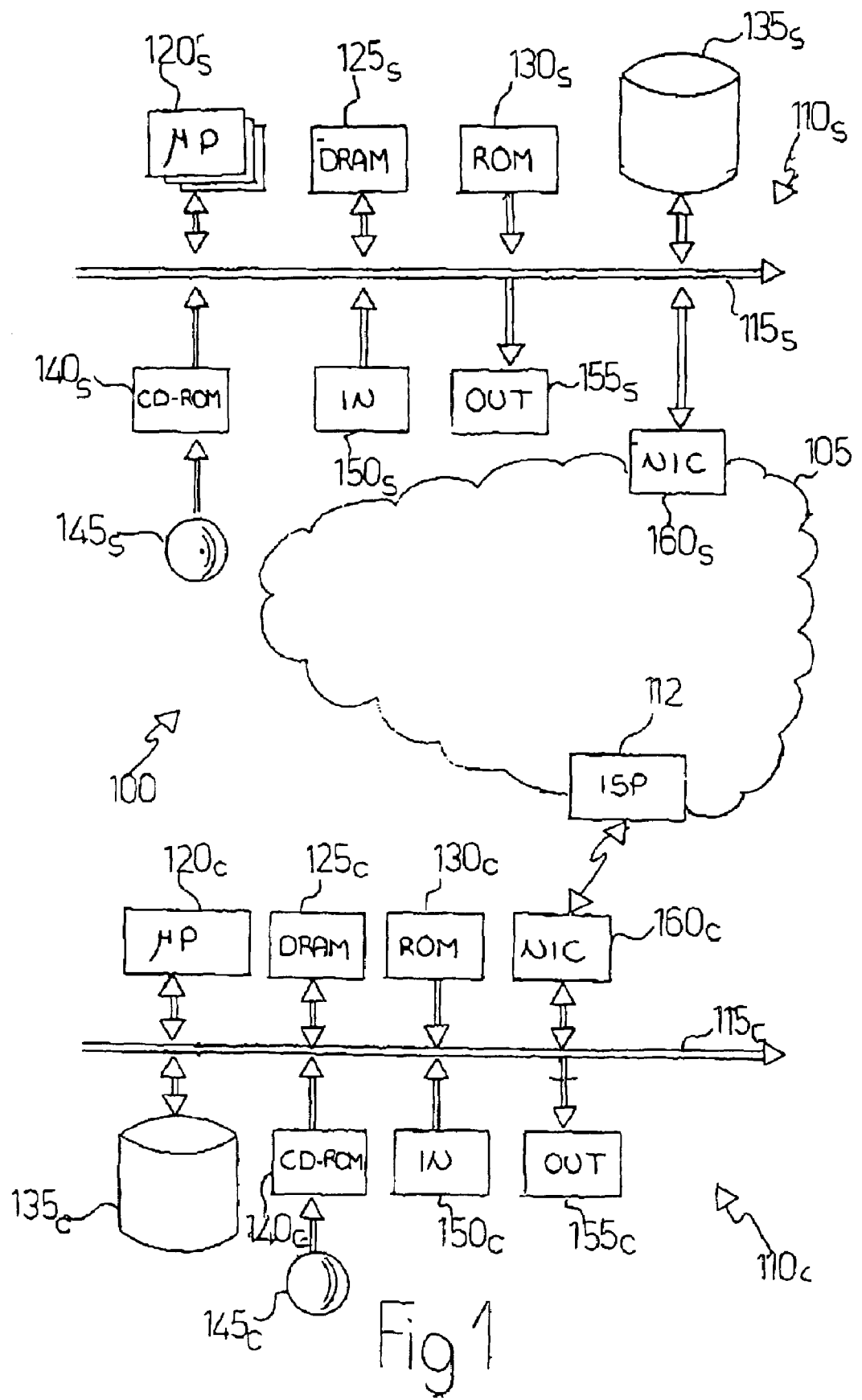
FIG. 1 is a schematic block diagram of a data processing system in which the method of the invention can be used.

With reference in particular to FIG. 1, a data processing system 100 that relies on the INTERNET 105 is depicted. Client computers 110c get into the INTERNET 105 through an Internet Access Provider (ISP) 112; access to the INTERNET 105 allows users of the clients 110c to exchange information, send and receive e-mail, and view documents. Particularly, one or more server computers 110s provide an infrastructure hosting a series of forums.

Each forum consists of an online discussion group, in which participants with common interests can exchange messages on a specific topic. The forum is typically implemented as a mailing list, wherein each message is broadcast to a defined group of e-mail addresses, or as an electronic message centre (also known as Bulletin Boards, or BBS), wherein each participant may leave his or her own message in a repository and review messages left by others. All the participants view the content of the forum. Moreover, they may actively participate in the discussion by submitting messages; typically, each new message is posted to the server so as to be appended to the forum. The participants are either simple members (which can only read and submit messages) or leaders (which are responsible for the content and management of the forum). For example, the members are standard users submitting generic questions (such as on medical or legal topics), whereas the leaders are experts appointed to answer the questions.

Each client 110c, typically consisting of a Personal Computer (PC), is formed by several units that are connected in parallel to a communication bus 115c. In detail, a microprocessor (μP) 120c controls operation of the client 110c, a DRAM 125c is used directly by the microprocessor 120c as a working memory, and a ROM 130c stores a basic program for the bootstrap of the client 110c. Several peripheral units are further connected to the bus 115c (by means of respective interfaces). Particularly, a mass memory consists of a hard-disk 135c and a driver 140c for reading CD-ROMs 145c. Moreover, the client 110c includes input devices 150c (for example consisting of a keyboard and a mouse), and output devices 155c (for example consisting of a monitor and a printer). A Network Interface Card (NIC) 160c is used to connect the client 110c to the INTERNET 105.

An analogous structure (suitably scaled) is used for each server 110s. In detail, the server 110s (for example consisting of a minicomputer) is formed by a bus 115s, multiple microprocessors 120s, a DRAM 125s and a ROM 130s. The server 110s further includes a hard-disk 135s, a driver 140s for CD-ROMs 145s, input devices 150s and output devices 155s; a NIC 160s is used to plug the server 110s into the INTERNET 105.

Similar considerations apply if a different network is envisaged (such as an INTRANET), if the client and the server have a different structure (for example with the PCs replaced with network computers or web TV systems), if the computers include different units (such as a web cam). Alternatively, the forum is structured in a different manner, the messages are submitted to the forum and made available to the participants with other procedures, the leaders are replaced with equivalent privileged users (such as a moderator or a forum owner), the participants are organised into two or more different sets (each one formed by one or more participants), and so on.

Figure 2:
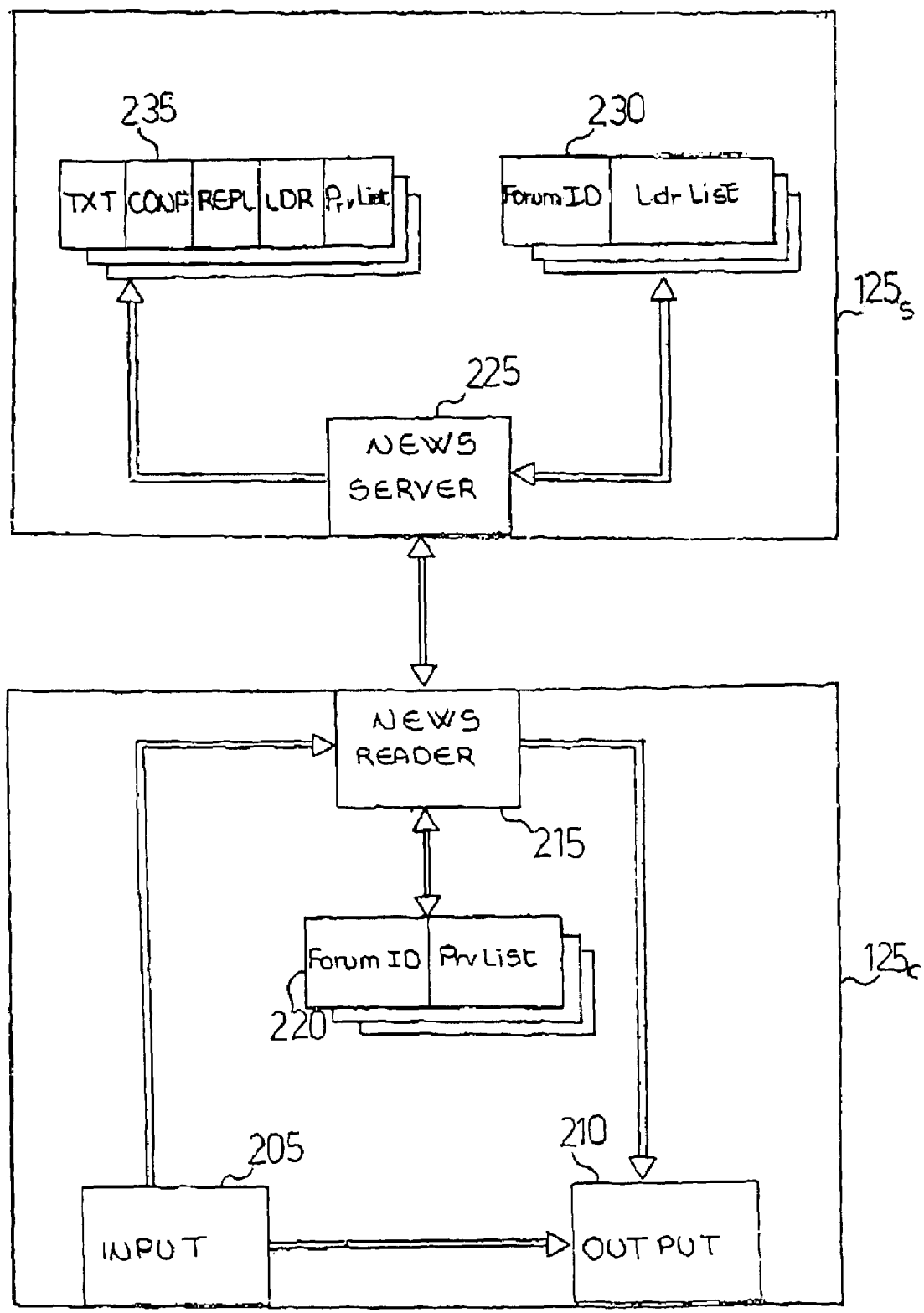
FIG. 2 shows a partial content of the working memories of a server computer and of a client computer included in the system.

Considering now FIG. 2, a partial content of the working memory 125c of the client and of the working memory 125s of the server are shown; the information (programs and data) is typically stored on the respective hard-disks and loaded (at least partially) into the working memories when the programs are running, together with an operating system and other application programs (not shown in the figure). The programs are initially installed onto the hard disks from CD-ROMs.

Considering in particular the working memory 125c of the client, an input interface 205 is used to enter data and/or commands (with the keyboard and the mouse) by the user. The input interface 205 directly drives an output buffer 210 for the monitor of the client. The input interface 205 is further coupled to a news reader 215, which enables the user to view the content of forums and to submit his or her own messages. The news reader 215 controls a table 220 including a record (accessed through a respective identifier ForumID) for each forum to which the user is registered; the record stores a list of privileged participants PrvList, which is customised by the user. The news reader 215 directly interfaces with the output buffer 210.

The working memory 125s of the server includes a news server 225, which executes commands submitted by each client and delivers corresponding messages (e-mail or web pages). The news server 225 accesses a table 230 including a record for each forum hosted by the server; the record includes the forum identifier ForumID and a list LdrList of the respective leaders. Moreover, the news server 225 controls a repository 235 of messages submitted to each forum.

The message consists of a field including a body TXT of the message and a flag CONF indicating whether the message is confidential; when the message is confidential (flag CONF asserted), the message further includes one or more fields REPL defining replacement texts for the message, a flag LDR indicating whether the confidential message is accessible to the leaders of the forum or to specific privileged participants, and the corresponding privileged participant list Prvlist (when the flag LDR is deasserted).

Similar considerations apply if the whole application (programs on the client and on the server) and the corresponding data are structured in a different manner, if the tables storing the privileged participant list and the leader list are replaced with equivalent memory structures, if the messages include images or other information, if the messages have a different format, and the like.

Figure 3A:
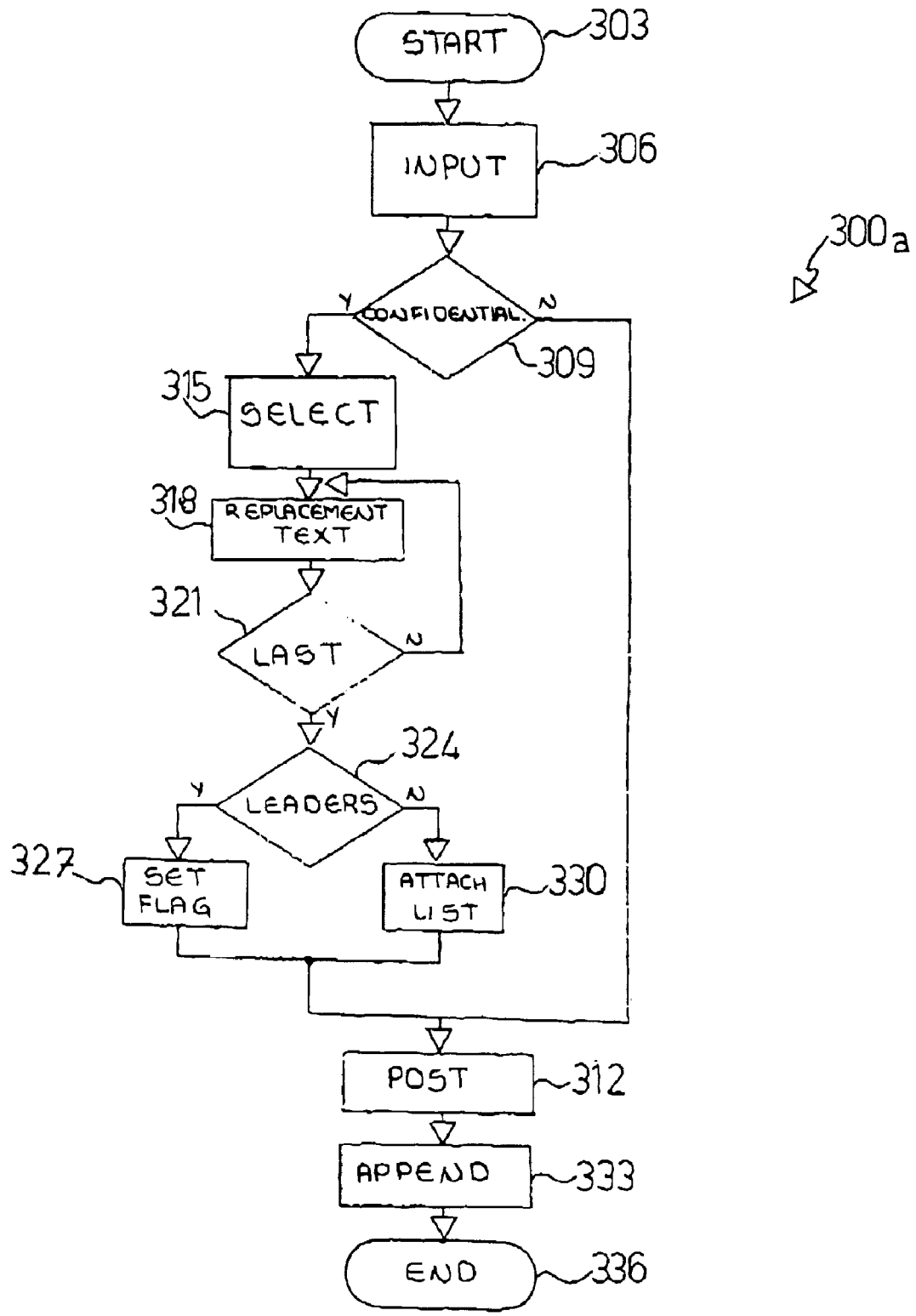
FIGS. 3a-3b are flow charts describing the logic of methods used for submitting messages to a forum and for viewing its content, respectively.

As shown in FIG. 3a, whenever a participant wishes to submit a new message to a generic forum a method 300a is executed. The method starts at block 303, and then passes to block 306 wherein the user of the client inputs the body TXT of a message to be submitted to the forum (for example typing a text with the keyboard and/or embedding files stored on the hard-disk).

A test is made in decision block 309 to determine whether the user has defined the message as confidential. If not, the method descends into block 312 (described in the following). Conversely, the confidential flag CONF (deasserted as a default) is asserted at block 315; moreover, the user selects one or more portions of the message (typically including private information), which he or she does not want to share with all the other participants in the forum. Continuing to block 318, the user is prompted to enter the replacement text REPL (for example, consisting of generic information for understanding the message) for a first (confidential) portion of the message. The method verifies at block 321 whether a last confidential portion of the message has been processed. If not, the method returns to block 318 for having the user enter the replacement text REPL for a next confidential portion of the message. On the contrary, a test is made in decision block 324 to determine whether the confidential message is to be made available to the leaders of the forum. If so, the leader flag LDR is asserted at block 327; conversely, the leader flag LDR is deasserted and the privileged participant list Prvlist (extracted from the respective table) is embedded in the message at block 330. In both cases, the method then descends into block 312.

The message (including the body TXT, the confidential flag CONF, the replacement texts REPL, the leader flag LDR, and the privileged participant list Prvlist) is posted at block 312 to the server hosting the forum. Continuing to block 333, the message is inserted into the corresponding repository so as to be appended to the forum. The method then ends at the final block 336.

Figure 3B:
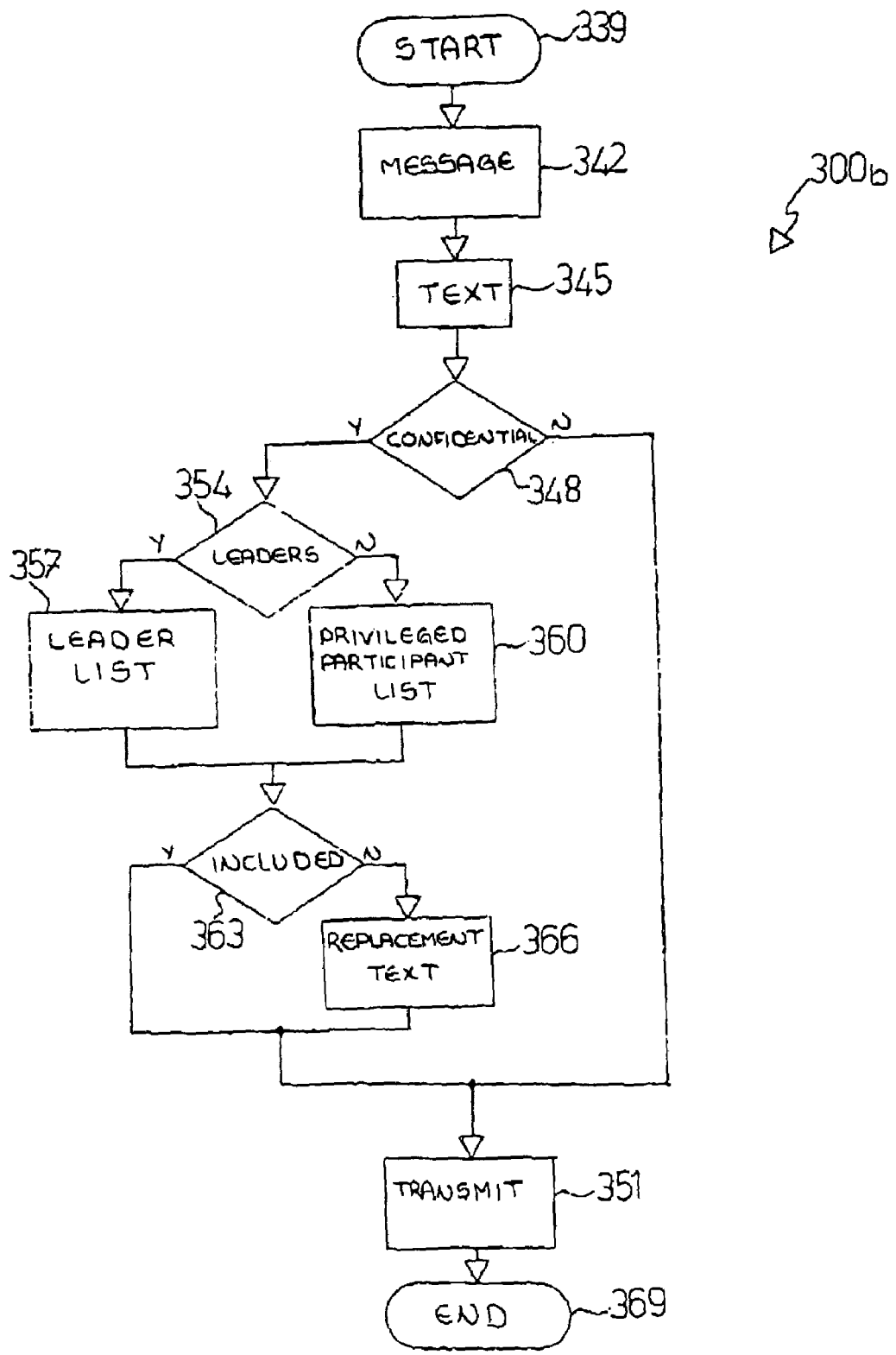

Moving now to FIG. 3b, whenever a message is to be delivered from the server to a generic participant in the forum a further method 300b is executed. The method starts at block 339, and then passes to block 342 wherein the message is retrieved from the corresponding repository; for example, each new message is broadcast to all the participants automatically (when the forum is implemented as a mailing list), or the messages are transmitted to a specific participant on request (when the forum is implemented as an electronic message centre).

Proceeding to block 345, the body TXT is extracted from the message. The confidential flag CONF is then checked at block 348. If the confidential flag CONF is deasserted, the method descends into block 351 (described in the following). Conversely, a test is made in decision block 354 to determine whether the leader flag LDR is asserted. If so, the leader list LdrList for the forum is retrieved from the respective table at block 357; on the contrary, the privileged participant list Prvlist is extracted from the message at block 360. In both cases, the method verifies at block 363 whether the participant to which the message is to be delivered is included in the current list associated with the message (leader list LdrList or privileged participant list Prvlist). If so, the method descends into block 351 directly. Conversely, the (original) body TXT of the message is updated at block 366, by substituting every replacement text REPL for the corresponding confidential portion; the method then proceeds to block 351.

Considering now block 351, the original or updated body is then transmitted to the client of the participant to which the message is to be delivered (in order to be displayed on its monitor). In this way, a confidential version of the message (i.e., the original body) is made available only to the participants in the forum needing the read the private information included therein; on the other hand, a public version of the message (i.e., the updated body) is made available to all the other participants. The method then ends at the final block 369.

For example, let us suppose that a user wishes to submit the following question to a forum on legal matters:

"Last year I was stopped by a policeman since I exceeded the speed limit of 40 Km/h. My driving licence was suspended for 3 months. Yesterday, I was stopped again since I was driving 80 Km/h faster than the speed limit. I would like to know if my driving license will be withdrawn".

After typing the question, the user selects with the mouse the portions of the message he or she deems confidential, for example "40 Km/h", "3 months", and "80 Km/h". The following replacement text is then input for the confidential portions of the message:

"40 Km/h"="a few km/h"
"3 months"="a certain period"
"80 Km/h"="far"

Therefore, the experts (such as lawyers) appointed to answer the question may read the original version of the message. On the contrary, all the other participants in the forum may only read the following updated version of the message (obtained substituting the replacement texts for the corresponding confidential portions):

"Last year I was stopped by a policeman since I exceeded the speed limit of a few Km/h. My driving license was suspended for a certain period. Yesterday, I was stopped again since I was driving far faster than the speed limit. I would like to know if my driving licence will be withdrawn".

Similar considerations apply if equivalent methods are performed, if the message is generated with a different procedure (for example, typing each replacement text immediately after selecting the respective confidential portion), if the public version of the message is generated on the client of each target participant (instead of on the server), and the like.

More generally, the present invention provides a method of controlling delivery of information in a forum having a plurality of participants. In the method of the invention, a plurality of different versions of a message, each one for a corresponding set of the participants, are provided; the versions of the message are submitted to the forum. Each version of the message is then made available to the corresponding set of the participants.

The proposed solution makes it possible to deliver information selectively among the participants in the forum.

Particularly, the method of the invention allows different versions of each message submitted to the forum to be made available to corresponding sets of the participants.

The preferred embodiment of the invention described above offers further advantages.

Particularly, the message is provided in a confidential version (for privileged participants) and in a public version (for all the other participants).

This architecture solves the most common problems relating to the use of the forums. For example, the devised feature enables every participant to submit questions including confidential information (needed by the experts to answer the questions), without having to disseminate private information (for example, about his/her health or legal situation) among the whole community of the forum.

However, different applications are envisaged and within the scope of the invention. For example, each message is submitted in two or more different versions each one for a corresponding category of the participants; a typical application is that of a technical forum on a specific product, wherein the messages are provided in a general version for developers using the product, in a detailed version for a technical support team, and in a simplified version for end-users of the product. Alternatively, the different versions of the message are made available to corresponding sets of the participants that are overlapping; for example, the privileged participants may read both the public version and the confidential version of the message, whereas all the other participants may only read the public version of the message.

In a particular embodiment of the invention, the privileged participants are defined for the whole forum in a list stored on the server hosting the forum.

In this way, the confidential version of the message may be made available to a default group of participants in a very simple manner.

Alternatively, the message is associated with a list of the privileged participants on the client from which the message is submitted to the forum.

This additional feature enables each user to customise the list of privileged participants to which the confidential version of the message is to be delivered.

However, the solution of the invention leads itself to be implemented even defining the privileged participants in a different manner (for example, combining the list stored on the server with the list defined on the client).

Preferably, the message is provided in an original version together with replacement information for selected portion thereof.

The proposed solution makes it very easy to define the confidential version and the public version of the message.

As a further improvement, the original version is made available to the privileged participants directly; the other version of the message is generated replacing every selected portion with the associated replacement information, and it is then made available to all the other participants (or vice-versa).

In this way, the memory space required for storing the confidential version and the public version of each message is strongly reduced.

Alternatively, the different versions of the message are generated directly when the message is appended to the forum, different texts are input on the client for each version of the message, and the like.

Advantageously, the solution according to the present invention is implemented with a computer program (software) application, which is provided on CD-ROM. The application has a client-server architecture; particularly, it consists of a news reader (installed on the client) and of a news server (installed on the server).

Moreover, it should be noted that either the news reader or the news server is suitable to be implemented separately and put on the market even as a stand-alone product.

Alternatively, the program application is provided on floppy-disks, is pre-loaded onto the hard-disks, or is stored on any other computer readable medium, is sent to the client and server computers through the INTERNET, is broadcast, or more generally is provided in any other form directly loadable into the working memories of the computers. However, the method according to the present invention leads itself to be carried out with an application having a different architecture (for example, working on a single computer), or even with a hardware structure (for example, integrated in a chip of semiconductor material).

Naturally, in order to satisfy local and specific requirements, a person skilled in the art may apply to the solution described above many modifications and alterations all of which, however, are included within the scope of protection of the invention as defined by the following claims.

The invention claimed is:

1. A method of controlling delivery of information in a forum having a plurality of participants, the method including the steps of:
   receiving a plurality of different versions of a message, each one for a corresponding set of the participants, by a server computer hosting the forum, and
   making available each version of the message to the corresponding set of the participants, wherein the plurality of versions of the message consist of a confidential version and of a public version, the method further including the steps of defining a privileged subset of the participants, making available the confidential version of the message to the privileged subset of the participants, and making available the public version of the message at least to the participants not included in the privileged subset;
   wherein the message is a text message and wherein the different versions of the message includes an original version of the message selected between the confidential version and the public version, a selected at least one portion of the original version of the message to be replaced in the other version of the message, replacement textual information for replacing text in the at least one selected portion in the other version of the message, and a client list indicating a plurality of the participants included in the privileged subset for which the confidential version of the message is made available;
   wherein the step of making available each version of the message to the corresponding set of the participants is performed under control of the server computer hosting the forum, and includes making available the original version of the message to the corresponding set of the participants, and generating the other version of the message by replacing the at least one selected portion with the corresponding replacement textual information, associating a forum list defined for the forum that indicates a plurality of the participants included in the privileged subset for which the confidential version of the message is made available, and making available the other version of the message to the corresponding set of the participants such that some words are the same in both the original version and the other version of the message, and some words are different between the original version and the other version of the message, the different words resulting from the replacement textual information.

2. The method according to claim 1, further including the steps under the control of a client computer from which the versions of the message are submitted to the forum of:
   associating a list indicating the plurality of the participants included in the privileged subset for which the confidential version of the message is made available, and
   transmitting the list to the server computer hosting the forum.

3. A computer program directly loadable into a working memory of a server computer for performing a method of controlling delivery of information in a forum when the program is run on the server computer, the forum being hosted by the server computer and having a plurality of participants, wherein the method includes the steps of:
   receiving, by the server computer, a plurality of different versions of a message each one for a corresponding set of the participants from a client computer suitable to be connected to the server computer,
   appending, by the server computer, the versions of the message to the forum, and
   making available, by the server computer, each version of the message to the corresponding set of the participants, wherein the step of making available, by the server computer, each version of the message to the corresponding set of the participants includes making available an original version of the message to the corresponding set of the participants, and generating another version of the message by replacing text in at least one selected portion with replacement textual information, associating a forum list defined for the forum that indicates a plurality of the participants included in a subset of participants for which the another version of the message is made available, and making available the another version of the message to the subset of participants such that some words are the same in both the original version and the another version of the message, and some words are different between the original version and the another version of the message, the different words resulting from the replacement textual information.

4. A system for controlling delivery of information in a forum having a plurality of participants, the system including means for receiving a plurality of different versions of a message, each one for a corresponding set of participants, by a server computer hosting the forum, and means for making available each version of the message to the corresponding set of the participants, wherein the plurality of versions of the message consist of a confidential version and of a public version, the system further including means for defining a privileged subset of the participants, means for making available the confidential version of the message to the privileged subset of the participants, and means for making available the public version of the message at least to the participants not included in the privileged subset;
   wherein the message is a text message and wherein the different versions of the message includes an original version of the message selected between the confidential version and the public version, a selected at least one portion of the original version of the message to be replaced in the other version of the message, and replacement textual information for replacing text in the at least one selected portion in the other version of the message, and a client list indicating a plurality of the participants included in the privileged subset for which the confidential version of the message is made available;

wherein the means for making available each version of the message to the corresponding set of the participants is performed under control of the server computer hosting the forum, and includes means for making available the original version of the message to the corresponding set of the participants, and means for generating the other version of the message by replacing the at least one selected portion with the corresponding replacement textual information, means for associating a forum list defined for the forum that indicates a plurality of the participants included in the privileged subset for which the confidential version of the message is made available, and means for making available the other version of the message to the corresponding set of the participants such that some words are the same in both the original version and the other version of the message, and some words are different between the original version and the other version of the message, the different words resulting from the replacement textual information.

5. A server computer for controlling delivery of information in a forum, the forum being hosted by the server computer and having a plurality of participants, wherein the server computer includes means for receiving a plurality of different versions of a message each one for a corresponding set of the participants from a client computer suitable to be connected to the server computer, means for appending the versions of the message to the forum, and means for making available each version of the message to the corresponding set of the participants, wherein the means for making available each version of the message to the corresponding set of the participants includes means for making available an original version of the message to the corresponding set of the participants, means for generating another version of the message by replacing text in at least one selected portion with replacement textual information, means for associating a forum list defined for the forum that indicates a plurality of the participants included in a subset of participants for which the another version of the message is made available, and means for making available the another version of the message to the subset of participants such that some words are the same in both the original version and the another version of the message, and some words are different between the original version and the another version of the message, the different words resulting from the replacement textual information.

* * * * *